Oct. 17, 1950 — C. A. POSSON — 2,526,408
CYLINDRICAL SLIDE RULE
Filed Feb. 8, 1947 — 2 Sheets-Sheet 1
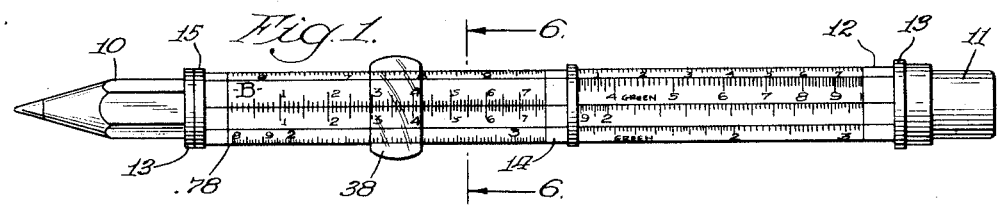
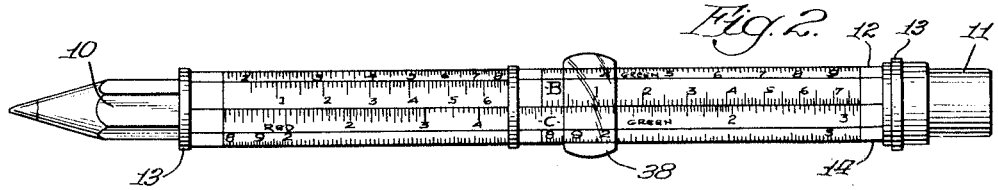
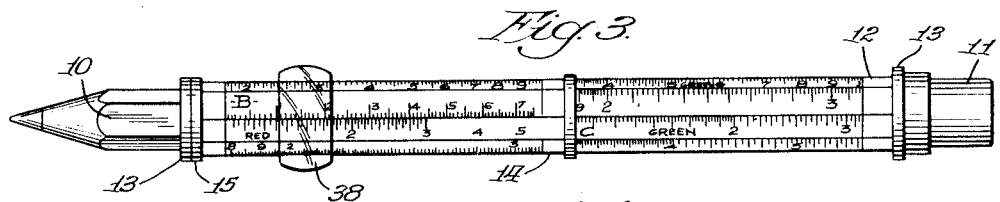
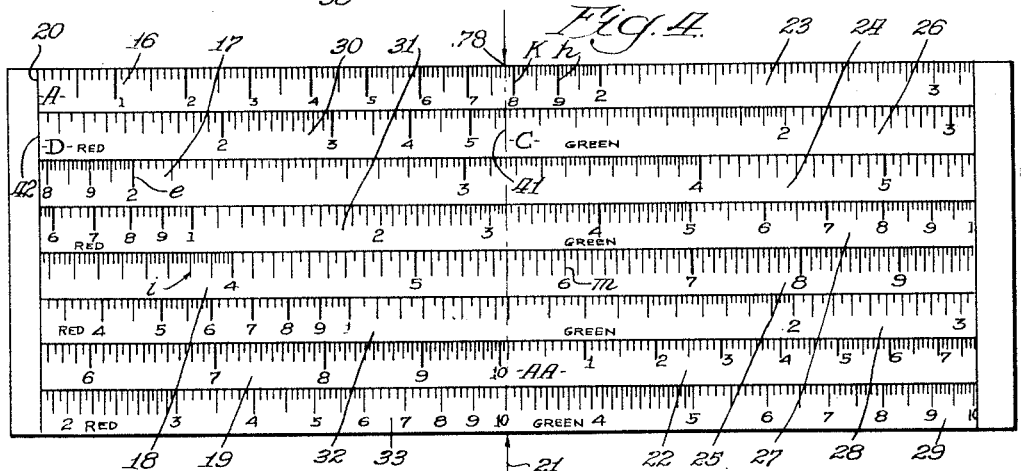
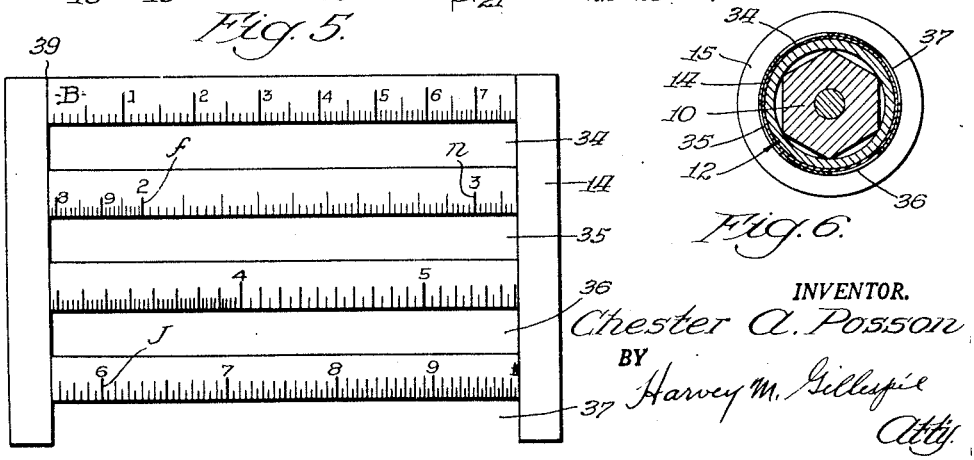
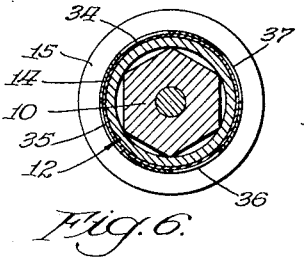
INVENTOR.
Chester A. Posson
BY Harvey M. Gillespie
Atty.

Oct. 17, 1950        C. A. POSSON        2,526,408
CYLINDRICAL SLIDE RULE

Filed Feb. 8, 1947        2 Sheets-Sheet 2

INVENTOR.
Chester A. Posson
BY Harvey M. Gillespie
Atty.

Patented Oct. 17, 1950

2,526,408

UNITED STATES PATENT OFFICE 2,526,408

CYLINDRICAL SLIDE RULE

Chester A. Posson, Chicago, Ill.

Application February 8, 1947, Serial No. 727,445

3 Claims. (Cl. 235—79.5)

This invention relates to certain new and useful improvements in slide rules.

A principal object of the invention is to provide an improved slide rule having fixed scales and a slide scale in which the graduations of said scales are so arranged that any selected value of the slide scale may be moved into cooperative coincidence with any selected value of a fixed scale without moving the graduations of the slide scale beyond the limits of the arranged graduations of the fixed scales.

Another object is to provide an improved slide rule which is so formed that it may be incorporated in the structure of a pencil or other writing implement or it may be formed as a separate tubular unit adapted to fit over the woodstock of an ordinary pencil.

Another object is to provide, in a cylindrical slide rule, an improved arrangement of graduated scales thereon, whereby a plurality of fixed scales may be arranged about a cylindrical surface in such a manner that scales of long lengths and having small valued graduations prominently marked thereon may be marked on cylindrical surfaces having lengths substantially shorter than the scales.

The invention may be described briefly as comprising a cylindrical surface, for example the stalk of a pencil or a separate tubular body adapted to fit over the woodstock of an ordinary pencil, provided with a plurality of scales composed of sections arranged in parallel strips extending lengthwise of the pencil or tubular body. The said scales are designated herein by the reference letters A, AA, C and D. The total length of each individual scale, as distinguished from its sectional strips, is substantially longer than the cylindrical surface occupied by the scale. By arranging the said scales A, AA, C and D in sectional strips, each scale may be made of sufficient length to permit the small valued graduations thereon to be prominently marked.

A slide member in the form of a sleeve is slidably and revolvably supported on the cylindrical base. The said slide is provided with windows of suitable width and thickness to coincide with each strip of a scale marked on the base. The graduations of a scale B are marked along the corresponding edges of each of the windows to cooperate with the graduations of the fixed scales on the base.

The scales are so arranged on the base that the strips forming a complete scale will extend only from one end of the scale arrangement to a transverse center so that the slidable sleeve can be moved lengthwise of the cylindrical base to positions whereby the windows formed in the sleeve will coincide with the strips forming any one of the scales on the base. The scales designated A and AA are identical, consequently, any selected graduation of the scale B formed on the sleeve can be moved into cooperative coincidence with any selected graduation of corresponding value disposed on opposite sides of the transverse center of the base. The scales designated C and D are preferably, but not necessarily, arranged on opposite sides of the transverse center of the scale arrangement on the base. It will be observed by reference to the drawings that the parallel strips forming the scale A coincide with connecting strips forming the scale AA at the other side of the transverse center. This arrangement makes it practicable in solving problems in multiplication, proportion and division involving low fractional values, for example, values between 0 and 2, to carry out the computation without movement of the scale B beyond the end limits of the arranged graduations. Consequently the present invention does not require, as is the case of an ordinary slide rule, an index cursor for maintaining a position while the slide member thereof is moved to another position.

The fixed scales designated C and D on the base are used in connection with problems involving powers and roots and the strips forming these scales are preferably positioned in alternate arrangement with the strips of scales A and AA.

It is therefore a specific object of this invention to provide a cylindrical slide rule suitable for use in connection with a pencil or other writing implement and constructed in the manner above briefly described.

The invention is illustrated in certain preferred embodiments in the accompanying drawings wherein:

Fig. 1 is a side view of a cylindrical slide rule constructed in accordance with this invention and arranged with the graduations on the movable scale B in coincidence with graduations of corresponding value of a fixed scale A.

Fig. 2 is a view similar to Fig. 1 but illustrating the base and slidable members of the rule arranged in positions whereby the scale B is arranged in cooperative position with the fixed scale C on the base.

Fig. 3 is a view similar to Fig. 2 but showing the slide scale B arranged in a position to cooperate with the scale D on the base.

Fig. 4 is a development of the base member so as to illustrate all fixed scales formed thereon.

Fig. 5 is a development of the slidable sleeve on which the scale B is formed.

Fig. 6 is a cross sectional view taken on line 6—6 of Fig. 1.

Figure 7:
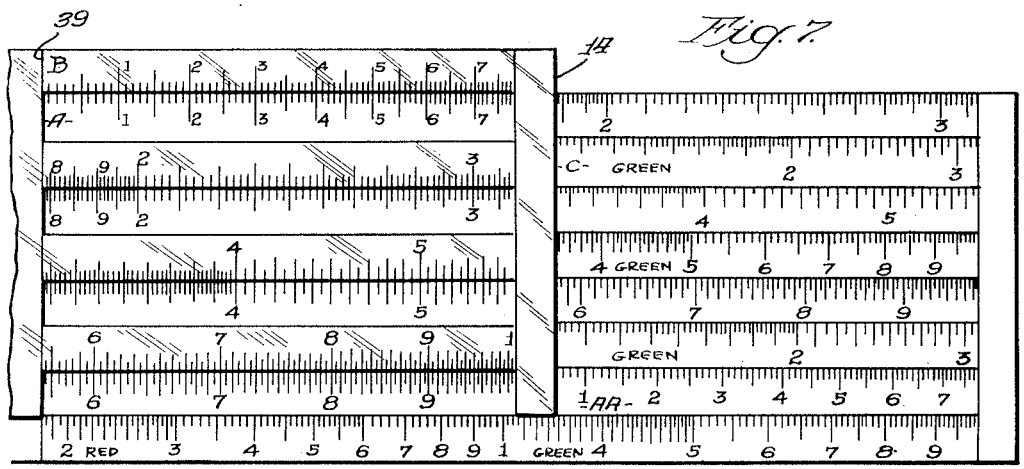
Fig. 7 is a development of both the base and the slidable sleeve arranged in positions corresponding to that indicated in Fig. 1.
Figure 8:
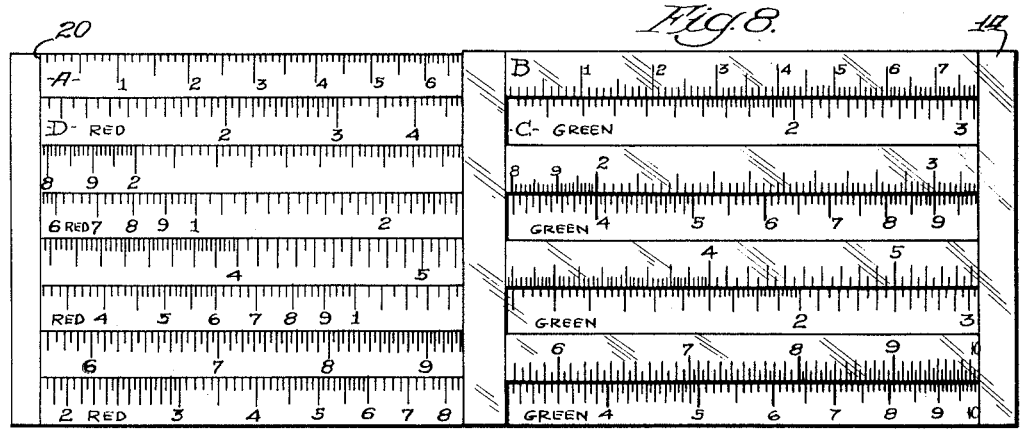
Fig. 8 is a development of the base and the slidable sleeve arranged in positions corresponding to that indicated in Fig. 2 of the drawing.
Figure 9:
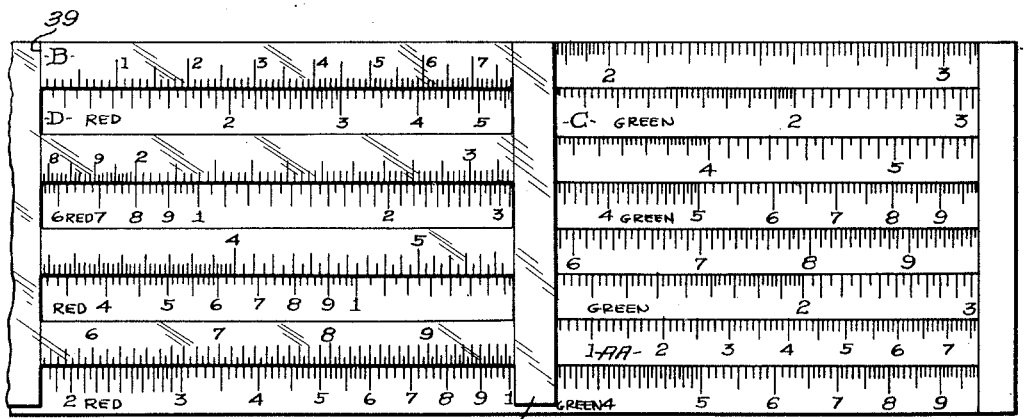
Fig. 9 is a similar development of the base and slidable sleeve, but showing the sleeve in the position indicated in Fig. 3 of the drawing.

The cylindrical slide rule of the present invention is illustrated herein in the form of a tubular unit adapted to fit over the woodstock of an ordinary pencil 10 so as to function as an extension for said pencil as it becomes shortened by use. The outer end of the tubular unit may be provided with an eraser 11. The said slide rule comprises a cylindrical tube 12 which is formed at either end with outwardly extending bead 13. The beads 13 serve as abutments to limit the sliding movements of a sleeve 14 which is slidably and revolvably supported on the tubular base 12. The sleeve 14 is provided at its opposite ends with outwardly extending beads 15 similar to the beads 13.

The cylindrical tube 12 serves as a base on which is marked or otherwise suitable fixed, a plurality of logarithmic scales designated A, AA, C and D. The scales A and AA have the same color and are provided with identical markings, but the scales C and D are preferably given distinctive colors so as to distinguish them from the other scales. For convenience, the scale C is colored green and the scale D is colored red.

The scale A is arranged in four strips of equal length designated 16, 17, 18 and 19 which extend parallel to each other lengthwise of the base. The several strips of the scale extending from the index line 20 at the left of the graduations on the base to a transverse center line 21 which coincides with the indexes or starting positions of the scales at the right of said center. It will be seen by inspection of Fig. 4 that the strip 16 of scale A terminates at the fractional value of .78 and the scale is continued on the second strip 17. The strips 18 and 19 are likewise continuation of the preceding strips. The scale AA corresponds in all respects to scale A, but the several strips 22, 23, 24 and 25 thereof are so arranged on the cylinder that the strip 23 of scale AA is longitudinally aligned with the strip 16 of scale A and constitutes, in effect, an extension of said strip; the strips 24 and 25 of scale AA are longitudinally aligned with strips 17 and 18 of scale A and the strip 22 of scale AA is in longitudinal alignment with strip 19 of scale A. Each of said strips of scale AA bear markings which constitutes continuations of the aligned strips. The several aligned strips of the scale A and AA are spaced apart and strips forming the scales C and D are positioned between them. The several sections of scale C are designated by the reference characters 26, 27, 28 and 29 and the several strips of scale D are designated by the reference numerals 30, 31, 32 and 33, respectively.

The scales A and AA, as above indicated, are identified by the same color and are used conjointly as an individual scale in the solution of multiplication, proportion and division. The scales C and D are distinguished by different coloring and are used in connection with problems involving powers and roots.

The sleeve 14 is slidably and revolvably mounted on the cylinder base 12 between the abutments 13—13 thereof and is provided with four windows designated 34, 35, 36 and 37, one for each of the four strips of any of the scales on the base. The length and width of each of the said windows correspond to the length and width of each strip of the several fixed scales marked on the base. It will be seen therefore that when the sleeve is in its extreme left position, as shown in Fig. 1, the graduations of the four strips of the scale A at the left of the transverse center 21 are visible through the several windows of the sleeve. When the slidable sleeve is moved to the extreme position at the right of the base 12, all graduations of the several strips of scale AA at the right of the transverse center 21 are visible through the windows. Each band or strip of scale B serves to cover the adjacent strip of a fixed scale which is not being used. In this way the person using the slide rule may concentrate his attention on the scale being used.

When using the improved slide rule in connection with problems of multiplication, proportion and division the slidable sleeve may be moved to any position relative to the index line 20 of scale A and the transverse center 21.

A transparent ring 38 is slidably positioned on the sleeve 14 so that it may be moved back and forth across all windows thereof. The said ring 38 is preferably formed with a transverse curved outer surface so that it will function as a magnifying lens.

Figs. 4 and 5 of the drawings are drawn to exact scale so that Fig. 5, if cut out and placed on Fig. 4, can be moved to the various positions called for in the following examples.

When using the improved slide rule in connection with problems involving multiplication the sleeve 14 is moved so that index or starting position 39 of scale B coincides with the multiplicand on scale A. The product can be read on the scale A or scale AA, as the case may be, in the window below the multiplier indicated on scale B. For example, if the sleeve is moved lengthwise of the base and is also rotated so as to position the index 39 of scale B opposite the multiplicand "2" (designated by reference letter e on Fig. 4) on scale A, the product of said multiplicand "2" times any multiplier found on the scale B can be read on scales A and AA in the window below the selected multiplier. Any other problem in multiplication can be solved in the same manner by shifting the said index 39 of scale B to any selected multiplicand on scale A.

When solving problems in proportion, the first item of the proportion will be formed on the scale B. The slidable sleeve 14 is then set so that the said first term of the proportion on said scale B coincides with the second term of the proportion on scale A or on scale AA, as the case may be. Then the third term of the proportion, found on scale B will be in coincidence with the fourth or unknown term on scale A, or AA. For example, in solving the proportion in 10:19::2:X, the first term of the proportion is found on scale B (designated 39 in Fig. 5). This term is moved into coincidence with the second term 19, to wit 1.9 (designated h) on scale AA. The third term 2 is found on scale B (designated f on Fig. 5) and is in coincidence with the unknown fourth term 3.8 (designated $i$ on Fig. 4) on scale A.

The proportion of 6:18::2:X, when solved on an ordinary slide rule requires the use of a cursor or runner for marking the position of the first term of the proportion. For example, when the first term 6 on the slide scale B of an ordinary slide rule is positioned opposite the second term 18, to wit, 1.8, the third term 2 assumes a position beyond the left end of the scale A. The cursor is therefore positioned so that the hair line thereof will mark the coinciding positions of the first two terms and the slide scale B is then moved to the right until the left index of scale B is under the hair line of the runner. Then the third term 2 on scale B will coincide with the unknown fourth term 6 on scale A.

Such problems in proportions, as above indicated, may be solved on the present slide rule without the use of a cursor. In solving the same problem on the present invention the first term of the proportion, to wit, 6 (identified by the letter $j$) on scale B is merely positioned to coincide with the second term 18, to wit, 1.8 (designated by the letter $k$) on scale AA. The unknown fourth term 6 (designated $m$) will then be found on scale A below the third term 2 (designated $f$) on scale B.

Division

When solving problems in division the selected divisor on scale "B" is positioned to coincide with the dividend on scale A or scale AA, as the case may require. The index 39 on scale "B" will then coincide with the quotient found on scale A. For example, when solving the simple problem of 39÷3, the divisor 3 (designated $n$) on scale "B" is positioned to coincide with the dividend 39 (designated $h$), on scale AA. The quotient 13, to wit 1.3 (designated by reference $i$), is found on scale A opposite the index 39 of scale "B."

Powers and roots

When finding the square of a given number or when extracting the square root of a number the slide scale B on sleeve 14 is used in combination with the fixed scale C on the base. The scale C is marked on the base at the right of the transverse center 21 and is composed as previously indicated of parallel strips 26, 27, 28 and 29 arranged in alternation with the several strips of scale AA. When the four windows of sleeve 14 are positioned to show the four strips of scale C, the several strips of the scale B cover the adjacent strips of scale AA.

When it is desired to find the square of a number, the index 39 of scale B is positioned to coincide with the index 41 of scale C. The square of any number or value selected on scale "B" will appear in the adjacent windows of the slide 14 in a position opposite the selected root. Inasmuch as the four strips of the scale C register with the four windows of the sleeve 14, the square of any number selected can be found by merely rotating the slide rule as a whole about its longitudinal axis until the desired root is found on scale B. The desired square will be in the adjacent window in register with the root selected.

The cube scale D is composed of four strips 30, 31, 32 and 33 positioned at the left of the transverse center 23 in alternate arrangement with the several strips of scale A, and in longitudinal alignment with the several strips of scale C.

To find the cube of a cube root selected on scale "B," the slide 14 is moved to its extreme left and the index 39 thereof is positioned to coincide with the index 42 of scale D. The cube reading of any root selected on scale B may be found in an adjacent window of the sleeve in register with the selected root on the scale B.

While the invention is shown herein in connection with certain specific construction, it will be obvious that the principle of the invention may be embodied in other slide rule constructions. It is to be understood that the constructions herein shown are intended merely as illustrators and not as limitations except insofar as the specific arrangement and constructions are specified in the appended claims.

I claim:

1. A slide rule comprising a relatively long cylindrical base member provided with two main logarithmic scales each arranged in spaced apart parallel strips on opposite sides of a transverse center, the strips of the main scale on one side of the transverse center being disposed in longitudinal alignment with the strips of the main scale on the other side of said transverse center and constituting continuations thereof, another pair of scales disposed on opposite sides of said transverse center of the base and composed of strips which are longitudinally aligned in the spaces between the strips of the main scales but do not constitute continuations of each other and represent squares and cubes, respectively, of the graduations on the main scales, and a sleeve slidably and revolvably mounted on said base and provided with a plurality of windows therein, positioned to register with all sections of any one of the scales on the base and provided also along the edges of successive windows with scale graduations corresponding to the successive scale graduations of the main scale at either side of said transverse center, whereby any selected scale graduation on the sleeve may be moved into register with any selected graduation value appearing on the main scales and whereby the sleeve may be positioned at either side of said transverse center with the scale graduations of the sleeve positioned in computing relation with the graduations on the scale strips which are arranged at that side of the transverse center in the spaces between the strips of the main scale.

2. A slide rule comprising a relatively long cylindrical base member provided with two logarithmic scales each arranged in spaced apart parallel strips on opposite sides of a transverse center, the strips of the main scale on one side of the transverse center being disposed in longitudinal alignment with the strips of the main scale on the other side of said transverse center and constituting continuations thereof, a third scale positioned on the base at one side of said transverse center and composed of strips positioned in the spaces between the strips of the main scale and provided with graduations representing squares of the graduations on the main scales, and a sleeve slidably and revolvably mounted on said base and provided with a plurality of windows therein positioned to register with all sections of any one of the scales on the base and provided along the edges of successive windows with scale graduations corresponding to the successive scale graduations of the main scale at either side of said transverse center, whereby any selected scale graduation of the sleeve may be moved into register with any selected scale graduation value appearing on the main scales and whereby all graduations of the sleeve may be moved into computing relationship with the graduations of said third scale and represent the square roots of the graduations shown on said third scale.

3. A slide rule comprising a relatively long cylindrical base member provided with two main logarithmic scales each arranged in spaced apart parallel strips on opposite sides of a transverse center, the strips of the main scale at one side of the transverse center being disposed in longitudinal alignment with the strips of the main scale at the other side of said transverse center and constituting continuations thereof, a third scale positioned on the base at one side of said transverse center and composed of strips positioned in the spaces between the strips of the main scale and provided with graduations representing cubes of the graduations on the main scales, and a sleeve slidably and revolvably mounted on said base and provided with a plurality of windows therein positioned to register with all sections of any one of the scales on the base and provided along the edges of successive windows with scale graduations corresponding to the successive scale graduations of the main scale at either side of said transverse center, whereby any selected scale graduation of the sleeve may be moved into register with any selected scale graduation value appearing on the main scales and whereby all graduations of the sleeve may be moved into computing relationship with the graduations of said third scale and represent the cube roots of the graduations shown on said third scale.

CHESTER A. POSSON.

REFERENCES CITED

The following references are of record in the file of this patent:

FOREIGN PATENTS

| Number | Country | Date |
| --- | --- | --- |
| 23,968 | Great Britain | 1914 |
| 337,487 | Great Britain | Nov. 6, 1930 |